US008339470B2

United States Patent
Narayanan et al.

(10) Patent No.: US 8,339,470 B2
(45) Date of Patent: Dec. 25, 2012

(54) METHOD AND SYSTEM FOR GENERATING A HIGH RESOLUTION IMAGE

(75) Inventors: Rajagopalan Ambasamudram Narayanan, Tamil Nadu (IN); Arnav Vinayak Bhavsar, Tamil Nadu (IN)

(73) Assignee: Indian Institute of Technology Madras, Tamil Nadu (IN)

( * ) Notice: Subject to any disclaimer, the term of this patent is extended or adjusted under 35 U.S.C. 154(b) by 447 days.

(21) Appl. No.: 12/627,725

(22) Filed: Nov. 30, 2009

(65) Prior Publication Data

US 2011/0128394 A1 Jun. 2, 2011

(51) Int. Cl.
*H04N 5/228* (2006.01)
(52) U.S. Cl. .................... 348/222.1; 348/218.1
(58) Field of Classification Search ............ 348/42, 348/222.1, 218.1
See application file for complete search history.

(56) References Cited

U.S. PATENT DOCUMENTS

| | | | | |
|---|---|---|---|---|
| 6,466,618 | B1 * | 10/2002 | Messing et al. | 348/42 |
| 7,953,297 | B2 * | 5/2011 | Aiso | 382/299 |
| 2005/0244081 | A1 * | 11/2005 | Zhou et al. | 382/299 |
| 2006/0029256 | A1 * | 2/2006 | Miyoshi et al. | 382/104 |
| 2007/0206678 | A1 * | 9/2007 | Kondo | 375/240.17 |

OTHER PUBLICATIONS

Bhavsar, A., et al., "Resolution Enhancement for Binocular Stereo," Proceedings of the IEEE International Conference on Pattern Recognition (ICPR 2008), Dec. 2008, pp. 1-4.
Boykov, et al., "Fast Approximate Energy Minimizations via Graph Cuts," IEEE Transactions on Pattern Analysis and Machine Vision, 2001, vol. 23, No. 11, pp. 1-8.
Chung, et al., "Numerical Methods for Coupled Super-Resolution," Inverse Problems, 2006, vol. 22, No. 4, pp. 1-19.
Drouin, M., et al., "Non-Uniform Hierarchical Geo-Consistency for Multi-baseline Stereo," Proceedings of the Fourth Canadian Conference on Computer and Robot Vision, 2007, pp. 1-8.
"JISCT Stereo Images," at http://vasc.ri.cmu.edu/idb/html/jisct/index.html printed Jul. 21, 2010.
Kang, S. B., et al., "Handling Occlusions in Dense Multi-view Stereo," Technical Report, MSR-TR-2001-80, 2001, pp. 1-8.
Li, S. Z., "Markov Random Field Models in Computer Vision," Computer Vision—ECCV '94, Lecture Notes in Computer Science, 1994, vol. 801/1994, 361-370.
Lin, et al., "Fundamental Limits of Reconstruction-Based Super-Resolution Algorithms under Local Translation," IEEE Transactions on Pattern Analysis and Machine Intelligence, 2004, vol. 26, No. 1, pp. 83-97.
Scharstein, D., et al., "A Taxonomy and Evaluation of Dense Two-Frame Stereo Correspondence Algorithms", International Journal of Computer Vision, 2002, vol. 47, No. 1/2/3, pp. 1-35.
Shen, H., et al., "A MAP Approach for Joint Motion Estimation, Segmentation, and Super Resolution," IEEE Transactions on Image Processing, Feb. 2007, vol. 16, No. 2, pp. 479-490.
Suresh, K. V., et al., "Robust Space-Variant Super-Resolution," IET International Conference on Visual Information Engineering, VIE 2006, Sep. 26-28, 2006, pp. 600-605.
Wei, Y., et al., "Asymmetrical Occlusion Handling Using Graph Cut for Multi-View Stereo," Proceedings of the IEEE Computer Society Conference on Computer Vision and Pattern Recognition (CVPR'05), 2005, vol. 2, pp. 1-8.

\* cited by examiner

*Primary Examiner* — Gevell Selby
(74) *Attorney, Agent, or Firm* — Brundidge & Stanger, P.C.

(57) ABSTRACT

A method for generating an image is provided. The method includes estimating a high resolution image from a plurality of low resolution images and downsampling the estimated high resolution image to obtain estimates of a plurality of low resolution images. The method also includes generating a desired high resolution image based upon comparison of the downsampled low resolution images and the plurality of low resolution images.

19 Claims, 4 Drawing Sheets

METHOD AND SYSTEM FOR GENERATING A HIGH RESOLUTION IMAGE

BACKGROUND

High resolution images are desirable for a variety of applications such as in the areas of medical imaging, remote sensing, forensic imaging, and robotics applications, among others. Typically, high resolution images are obtained by combining information from a set of low resolution images obtained from two-dimensional scenes from different viewpoints. It also involves estimation of parametric relative motion. However, this technique may not be valid for three-dimensional scenes, in which case the motion estimation requires stereo disparity estimation.

Traditional stereo algorithms estimate disparity at the same resolution as that of the low resolution observed images which are assumed as averaged versions of a corresponding high resolution image. However, pixel averaging at low resolution may cause distortions in the estimated disparity. As a result, shape details may not be preserved in the high resolution depth map/stereo disparity map of the obtained image.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, a method for generating an image is provided. The method includes estimating a high resolution image from a plurality of low resolution images and downsampling the estimated high resolution image to obtain estimates of a plurality of low resolution images. The method also includes generating a desired high resolution image based upon comparison of the downsampled low resolution images and the plurality of low resolution images.

In accordance with another aspect, a method for generating an image is provided. The method includes (a) estimating a high resolution image from a plurality of low resolution images, (b) downsampling a plurality of low resolution images from the high resolution image and (c) determining a penalty function value based upon the downsampled low resolution images and the plurality of images. The method also includes (d) correcting the high resolution image by reference to a depth map/stereo disparity map, (e) downsampling the corrected low resolution images from the corrected high resolution image and repeating steps (c), (d) and (e) until a desired high resolution image is obtained.

In accordance with another aspect, an image generation system is provided. The image generation system includes a memory configured to store a plurality of low resolution images of a single subject from different spatial viewpoints and an image processing circuit configured to estimate a high resolution image from the plurality of low resolution images and to generate a desired high resolution image based upon comparison of the estimated high resolution image, the plurality of images, and pixel shifts representative of a depth of pixels and different spatial viewpoints.

DETAILED DESCRIPTION

Figure 1:
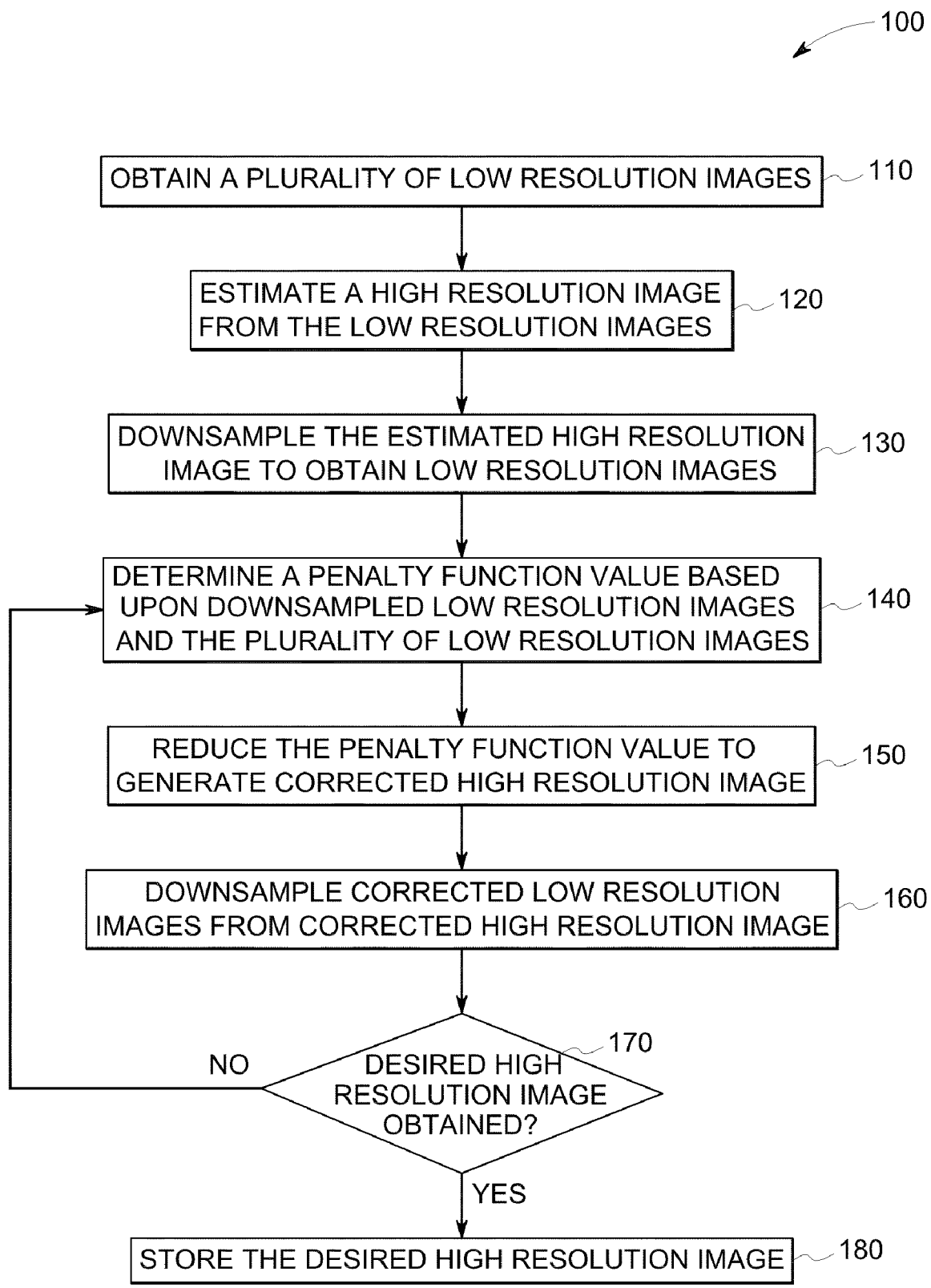
FIG. 1 is an example flow diagram of an embodiment of a method for generating a high resolution image.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments are generally directed to enhancement of image resolution. Such techniques may be useful in obtaining images with high image resolution that facilitate analysis, diagnosis or other purposes in a variety of applications.

Referring now to FIG. 1, an example flow diagram 100 of an embodiment of a method for generating a high resolution image is illustrated. As used herein, the term "high resolution image" refers to a high resolution intensity image and high resolution depth map/stereo disparity map. At block 110, a plurality of low resolution images are obtained. In this example embodiment, the plurality of low resolution images comprise stereo images of a single subject/scene from different spatial view points. In particular, the plurality of low resolution images are captured as spatially shifted versions of the same subject/scene, with the shifts occurring at the sub-pixel levels. In one example embodiment, the plurality of low resolution images are captured as time-shifted versions of the same subject/scene.

In one embodiment, the stereo images are obtained from a plurality of stereo cameras disposed at different locations. In another embodiment, the stereo images are obtained by translation of a single stereo camera in different spatial viewpoints. In another example embodiment, the stereo images include images of a moving object captured using a camera. It should be noted that the stereo images may be obtained from known different spatial viewpoints and the resulting high resolution image may correspond to one of the known spatial view points in the input set, or may correspond to a different view.

At block 120, a high resolution image is estimated from the plurality of low resolution images. In this embodiment, the high resolution image is estimated by interpolation of the plurality of low resolution images. For example, the high resolution image may be estimated using bilinear interpolation of the low resolution images. In another example embodiment, the high resolution image may be estimated using bicubic interpolation of the low resolution images. Further, the estimated high resolution image is downsampled to obtain estimates of low resolution images (block 130).

In one example, the estimates of downsampled low resolution images are generated by averaging of pixels of the estimated high resolution images using a downsampling operator. However, a variety of other downsampling techniques may be employed to obtain low resolution images from the estimated high resolution image. Such estimates of downsampled low resolution images are then utilized to generate a desired high resolution image based upon comparison of these downsampled low resolution image estimates and the plurality of low resolution images, as described below.

At block 140, a penalty function value is determined based upon the downsampled low resolution images and the plurality of low resolution images. Moreover, the penalty function value is progressively reduced to generate a corrected high resolution image by iteratively estimating pixel values for the desired high resolution image based upon the estimated high resolution image and a depth map/stereo disparity map (block 150).

At block 160, corrected low resolution images are obtained by downsampling the corrected high resolution image. Further, it is verified if the corrected high resolution image has a desired resolution by comparing the penalty function value with a pre-determined threshold (block 170). If the corrected high resolution image is of the desired resolution then the image is stored in a memory or is displayed to a user (block 180). If a desired resolution of the high resolution image is not obtained, then the penalty function value is re-estimated using the corrected low resolution images (block 140) and the penalty function value is further minimized until the desired high resolution image is obtained.

Figure 2:
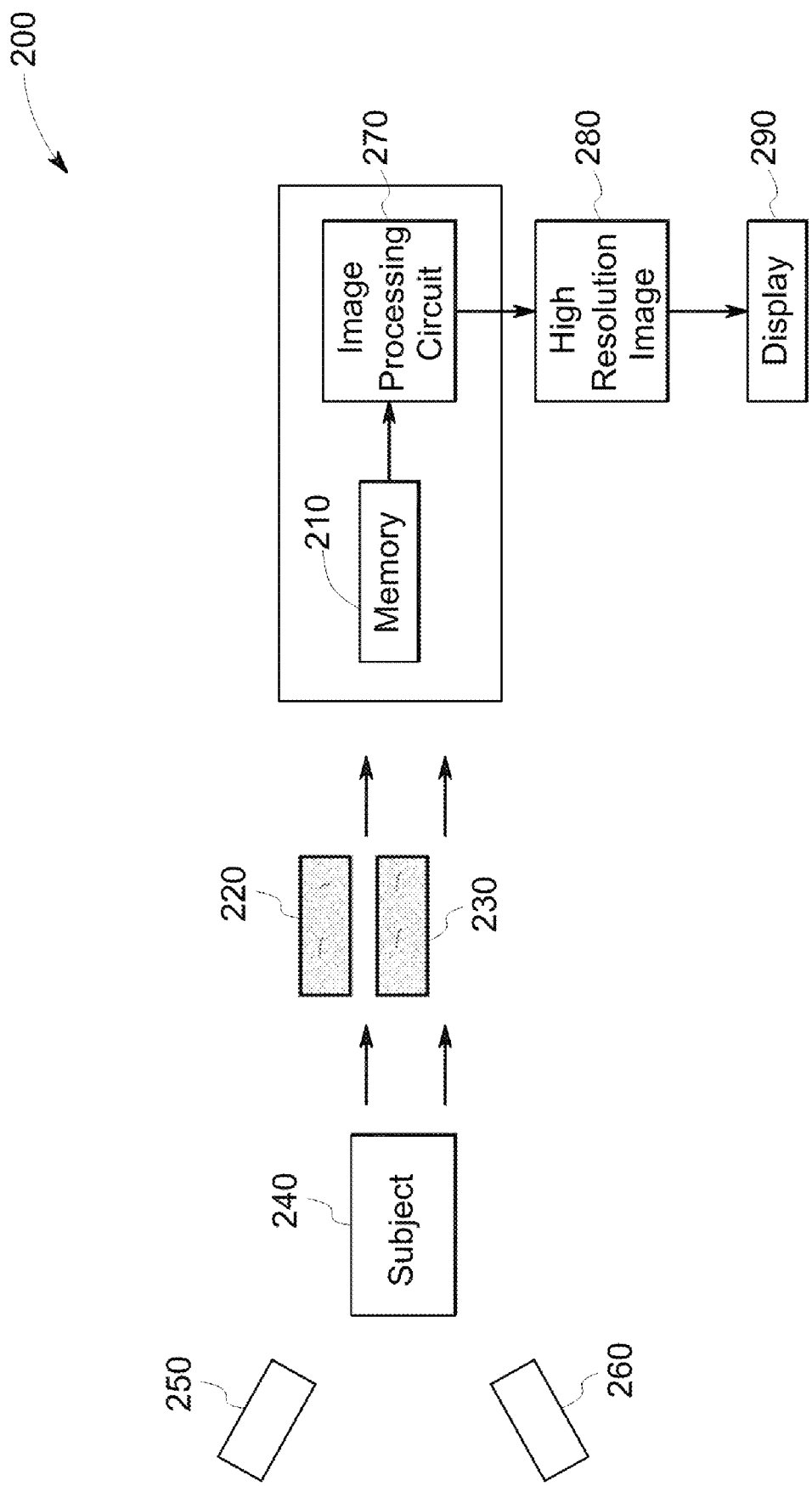
FIG. 2 is an illustrative embodiment of an image generation system.

FIG. 2 illustrates an example image generation system 200. The image generation system 200 includes a memory 210 configured to store a plurality of low resolution images such as represented by reference numerals 220 and 230 of a single subject 240 obtained from different spatial viewpoints. In this example embodiment, the low resolution images 220 and 230 are obtained using stereo cameras 250 and 260 respectively. In another embodiment, the low resolution images 220 and 230 may be obtained by translation of a single camera. In certain embodiments, the image generation system 200 includes a monochrome camera or a color camera, or a conventional film. In certain other embodiments, the image generation system 200 includes an infrared camera, or a thermal camera.

In certain example embodiments, the system 200 may include an illumination device (not shown) for illuminating the subject 240 and an image capture device (such as the camera 250) configured to capture the low resolution images 220 and 230 of the subject 240. Image capture may be performed by using any suitable illumination device and other imaging optics arrangement with possible configurations ranging from a single lens component to a multi-element lens.

It should be borne in mind that, although a single memory is described here, the storing function may be performed by more than one memory devices associated with the system for storing image processing routines, low resolution images, and so forth.

The memory 210 may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, and so forth.

Referring again to FIG. 2, the image generation system 200 also includes an image processing circuit 270 configured to estimate a high resolution image 280 from low resolution images 220 and 230 using the technique as described above with reference to FIG. 1. It should be noted that the low resolution images 220 and 230 of the subject 240 may be pre-generated and stored in the memory 210. Further, such images 220 and 230 may be accessed by the image processing circuit 270 to generate a desired high resolution image of the subject 240.

The high resolution image may be estimated by interpolation of the low resolution images 220 and 230. The image processing circuit 270 is configured to generate a desired high resolution image based upon comparison of the estimated high resolution image, the plurality of low resolution images 220 and 230 and the high resolution depth/stereo disparity.

In this embodiment, the estimated high resolution image is downsampled to obtain downsampled low resolution images. In certain embodiments, the resolution of the downsampled low resolution images is substantially equal to the resolution of the plurality of low resolution images, such as represented by reference numerals 220 and 230 obtained by the cameras 250 and 260 respectively. In one example embodiment, the estimated high resolution image is downsampled to obtain two downsampled low resolution images. The low resolution images ($y_i$) of size $N_1 \times N_2$ are downsampled from the estimated high resolution image (x) of size $L_1 \times L_2$ and are represented by the following relationship:

$$y_i = DW_i x + \eta_i \qquad (1)$$

Where: $y_i$ is the $i^{th}$ low resolution image;
D is the downsampling matrix;
$W_i$ is the warping matrix; and
$\eta_i$ is a noise component.

In this example embodiment, the downsampling matrix D uniformly averages $L_1/N_1 \times L_2/N_2$ high resolution pixels to one low resolution pixel. In this example embodiment, low resolution images downsampled from the estimated high resolution images may be represented by the following equations:

$$y_1(n_1, n_2) = \sum_{l_1, l_2 \in G} d(n_1, n_2, l_1, l_2) \cdot x(l_1, l_2) + \eta_1(n_1, n_2) \qquad (2)$$

$$y_2(n_1, n_2) = \sum_{l_1, l_2 \in G} d(n_1, n_2, l_1, l_2) \cdot x(l_1 - \delta(l_1), l_2) + \eta_2(n_1, n_2) \qquad (3)$$

Where: $\delta(l_1)$ is the disparity for the $(l_1, l_2)^{th}$ pixel;
G is the group of high resolution pixels that average to a low resolution pixel;
$d(n_1, n_2, l_1, l_2)$ is the down-sampling operator that averages the pixels in the high resolution group G resulting in the low resolution pixel $(n_1, n_2)$; and
$\eta_1(n_1, n_2)$ and $\eta_2(n_1, n_2)$ are noise components.

Furthermore, the desired high resolution image 280 is generated by progressively reducing a penalty function value based upon the downsampled low resolution images and the plurality of low resolution images 220 and 230. In this example embodiment, the penalty function value is estimated in accordance with the following relationship:

$$E = E_d(\delta, x) + E_\delta(\delta) + E_x(x) \qquad (4)$$

Where: $E_d(\delta, x)$ is the data term of the penalty function value;
$E_\delta(\delta)$ is a prior applied to the disparity; and
$E_x(x)$ is a prior applied to the image.

In the illustrated embodiment, the priors $E_\delta(\delta)$ and $E_x(x)$ include Markov Random Fields (MRF) priors applied to the disparity and the image respectively which facilitate reduction of noise in the high resolution image 280. In certain embodiments, occlusions due to undesirable objects are substantially reduced in the high resolution image 280. In particular, occluded pixels are detected in the estimated high resolution image 280 and the penalty function value for non-occluded pixels in the estimated high resolution image 280 is reduced to obtain the desired high resolution image.

In this example embodiment, the data term $E_d(\delta,x)$ of the penalty function value is estimated in accordance with the following relationship:

$$E_d(\delta, x) = \sum_{n_1,n_2=1}^{N_1,N_2} \left(y_1(n_1, n_2) - \sum_{l_1,l_2 \in G} d(n_1, n_2, l_1, l_2)x(l_1, l_2)\right)^2 + \\ \sum_{n_1,n_2 \in O'} \left(y_2(n_1, n_2) - \sum_{l_1,l_2 \in G} d(n_1, n_2, l_1, l_2)x(\theta(l_1), l_2)\right)^2 + \\ \sum_{n_1,n_2 \in O} \lambda_{OCC} \quad (5)$$

Where: $\theta(l_1) = l_1 - \delta(l_1)$;

O is the set of low resolution pixels each of which involves contribution from a high resolution site for which the high resolution pixel is occluded; and O' is the compliment of O.

Further, the priors $E_\delta(\delta)$ and $E_x(x)$ applied to the disparity and the image respectively are represented by the following relationships:

$$E_\delta(\delta) = \sum_{c \in C_\delta} v_c^\delta(\delta) \quad (6)$$

$$E_x(x) = \sum_{c \in C_x} v_c^x(x) \quad (7)$$

Where: c denotes a clique; and $C_\delta$ and $C_x$ represent set of all cliques for the high resolution disparity and image.

In this example embodiment, the penalty function value is alternatively minimized for the image and the depth map/stereo disparity map using iterated conditional modes (ICM) and alpha-expansion graph cut techniques respectively. However, a variety of other suitable techniques may be employed for minimization of the penalty function value. Thus, in alternate iterations, the current estimate of one of the image and depth map/stereo disparity map is utilized to determine the other variable. The penalty function value is progressively reduced until the value is below a pre-determined threshold to achieve the desired high resolution image 280. In this example embodiment, the threshold is configurable and may be defined by a user of the system 200. The desired high resolution image 280 is sent to an output of the system 200. In this example embodiment, the desired high resolution image 280 may be displayed to a user of the system through a display 290.

In certain embodiments, the priors $E_\delta(\delta)$ and $E_x(x)$ are selected to obtain a smooth solution for the high resolution image 280. In one example embodiment, a truncated absolute function is selected for the disparity prior $E_\delta(\delta)$ and a discontinuity adaptive MRF prior is selected for the image prior $E_x(x)$ In this embodiment, the discontinuity adaptive prior is represented by the following relationship:

$$E_x(x) = \gamma - \gamma e^{\frac{-(x(t,j) - x(p,q))^2}{\gamma}} \quad (8)$$

Where: $x(i,j)$ and $x(p,q)$ are neighboring pixels in the high resolution image; and $\gamma$ is a parameter that controls the discontinuity adaptiveness of the prior.

Advantageously, the priors described above facilitate robustness of the image estimation to any errors in disparity in addition to preserving any discontinuities and other details of the image.

Figure 3:
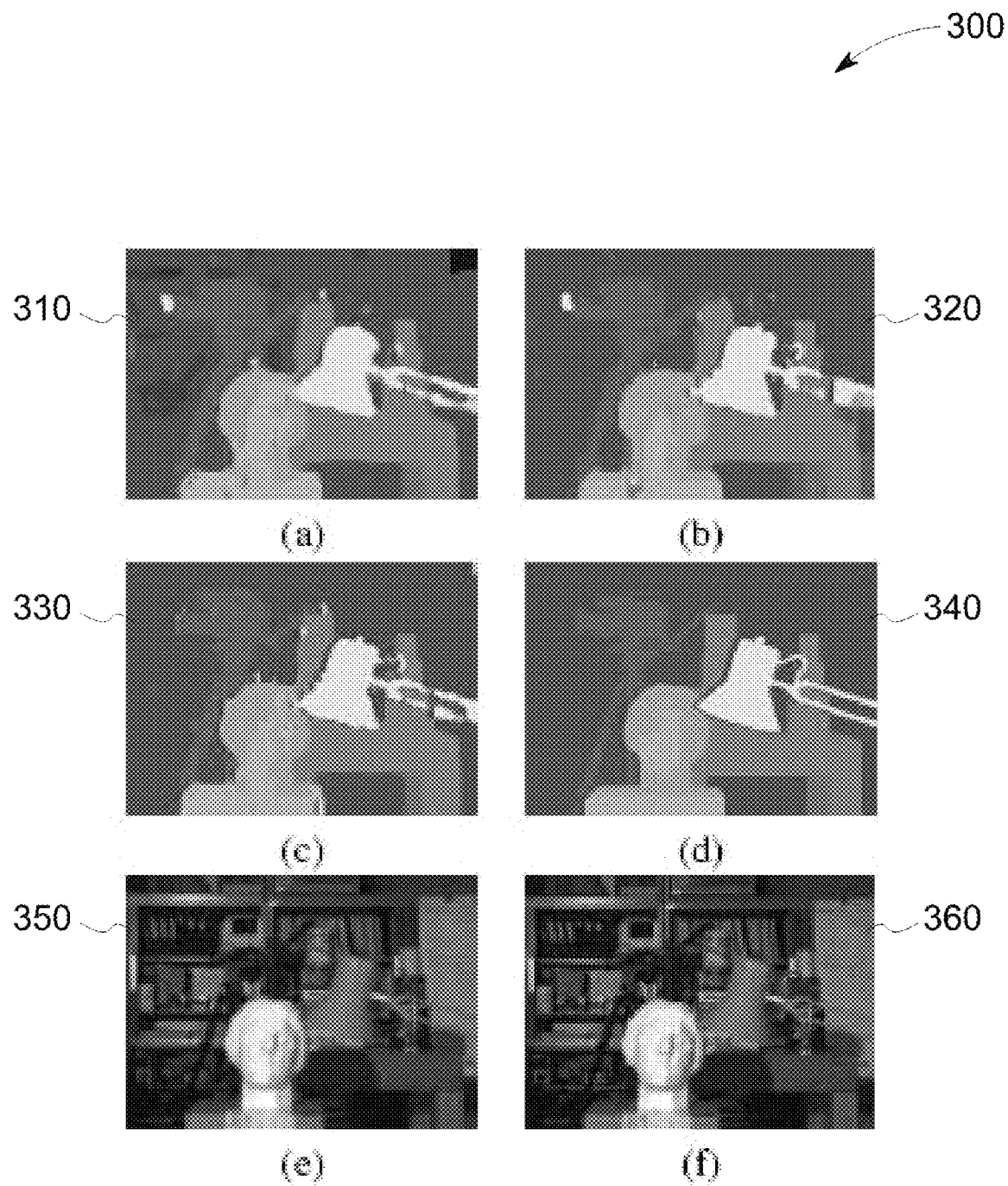
FIG. 3 illustrates example images generated by conventional image processing methods and by using the image generation system of FIG. 2.

FIG. 3 illustrates example images 300 generated by conventional image processing methods and by using the system 200 of FIG. 2. In this example embodiment, image generated with interpolated disparity computed by conventional stereo on low resolution images is represented by reference numeral 310. Further, image generated with high resolution disparity computed using stereo on interpolated images is represented by reference numeral 320.

Further, an image obtained using the technique described above and reference ground truth image are represented by reference numerals 330 and 340 respectively. As can be seen, the image 330 has lesser artifacts and distortions in the background as compared to images 310 and 320 and preserves the shapes of the objects being imaged. Moreover, the output image 330 is closer to the reference ground truth image 340 as compared to the images 310 and 320.

In this example, a bicubic interpolated image and a high resolution three-dimensional image obtained using the image generation system 200 of FIG. 2 are represented by reference numerals 350 and 360 respectively. As can be seen, the image 360 has substantially high resolution as compared to the bicubic interpolated image 350 and preserves the details of the imaged scene.

The example methods and systems described above facilitate generation of high resolution images from low resolution images provide resolution enhancement of images using non-parametric depth dependent pixel motion.

The image generation technique described above may be utilized in a variety of applications such as for generating three-dimensional models from low resolution images obtained from cell phones, for example. The technique may be utilized for rendering high resolution models for applications that need preservation of image details, such as heritage sites. Further, the technique also facilitates generation of images with incomplete data due to occlusions and so forth.

As will be appreciated by those of ordinary skill in the art, the foregoing example, demonstrations, and process steps may be implemented by suitable code on a processor-based system. It should also be noted that different implementations of the present technique may perform some or all of the steps described herein in different orders or substantially concurrently, that is, in parallel.

Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CDs or DVDs), or other media, which may be accessed by a processor-based system to execute the stored code.

Figure 4:
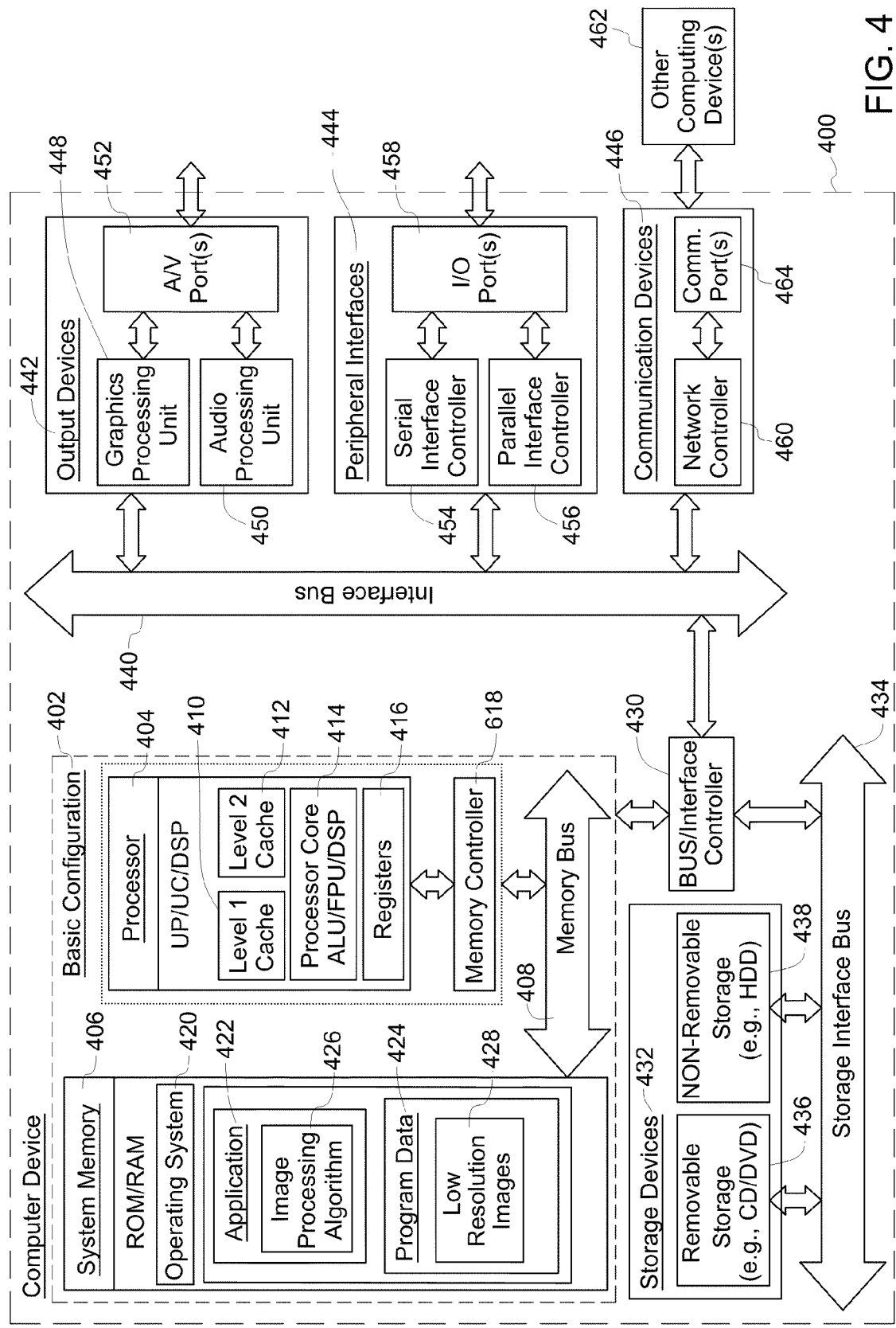
FIG. 4 is a block diagram illustrating an example computing device that is arranged for generating a high resolution image.

FIG. 4 is a block diagram illustrating an example computing device 400 that is arranged for generating high resolution images from low resolution images in accordance with the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an image processing algorithm 426 that is arranged to perform the functions as described herein including those described with respect to process 100 of FIG. 1. Program data 424 may include low resolution images 428 that may be useful for generating the desired high resolution image as is described herein.

In some embodiments, application 422 may be arranged to operate with program data 424 on operating system 420 such that generation of the desired high resolution image based upon comparison of downsampled low resolution images from an estimated high resolution image and a plurality of obtained low resolution images may be performed. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452.

Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 646 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal.

By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for generating an image, comprising:
determining an estimated high resolution image from a plurality of low resolution images;
determining a plurality of estimated low resolution images by down-sampling the estimated high resolution image; and
generating a corrected high resolution image by iteratively:
identifying a set of occluded pixels in the estimated high resolution image and a set of non-occluded pixels in the estimated high resolution image;
determining a value of a penalty function, wherein the penalty function is based on a difference between the plurality of estimated low resolution images and the plurality of low resolution images; and
adjusting pixel values of the estimated high resolution image to reduce the value of the penalty function for the set of non-occluded pixels.

2. The method of claim 1, wherein the estimated high resolution image is estimated by interpolation of the plurality of low resolution images.

3. The method of claim 1, wherein the identifying the set of occluded pixels and the set of non-occluded pixels includes determining a difference between the estimated high resolution image and one of a depth map or a stereo disparity map, wherein the one of the depth map or the stereo disparity map is based on a pixel shift representative of a depth of pixels at different spatial viewpoints.

4. The method of claim 1, wherein the plurality of low resolution images comprises images of a single subject from different spatial viewpoints.

5. The method of claim 1, wherein the penalty function includes a Markov Random Field based on one of a depth map or stereo disparity map.

6. The method of claim 1, further comprising:
storing the corrected high resolution image as a desired high resolution image in a memory when the value of the penalty function is below a threshold value.

7. A method for generating an image, comprising:
determining an estimated high resolution image from a plurality of low resolution images;
determining a plurality of estimated low resolution images by down-sampling the estimated high resolution image;
determining a value of a penalty function that is based on:
a difference between the plurality of estimated low resolution images and the plurality of low resolution images; and
a disparity based on one of a high resolution depth map or a stereo disparity map;
determining a corrected high resolution image by making an adjustment to the estimated high resolution image, wherein the adjustment is made by:
reducing the difference using an iterated conditional mode; and
reducing the disparity using an alpha-expansion graph cut;
determining a plurality of corrected low resolution images by down-sampling the corrected high resolution image; and
repeating the determining the value of the penalty function, the determining the corrected high resolution image, and the determining the plurality of corrected low resolution images until a desired high resolution image is obtained.

8. The method of claim 7, wherein the desired high resolution image is obtained when the value of the penalty function is below a threshold value.

9. The method of claim 7, wherein minimizing the disparity is based on a Markov Random Fields.

10. The method of claim 7, wherein an estimated low resolution image $y_1(n_1,n_2)$ for a group G of high resolution pixels of the estimated high resolution image that averages from a high resolution pixel $(l_1,l_2)$ to a low resolution pixel $(n_1,n_2)$ using a down-sampling operator $d(n_1,n_2,l_1,l_2)$ is estimated in accordance with the relationship:

$$y_1(n_1, n_2) = \sum_{l_1, l_2 \in G} d(n_1, n_2, l_1, l_2) \cdot x(l_1, l_2) + \eta_1(n_1, n_2).$$

11. The method of claim 10, wherein an estimated low resolution image $y2(n_1,n_2)$ for the group G of high resolution pixels of the estimated high resolution image that averages from the high resolution pixel $(l_1,l_2)$ with a disparity value $\delta(l_1)$ to the low resolution pixel $(n_1,n_2)$ using the down-sampling operator $d(n_1,n_2,l_1,l_2)$ is estimated in accordance with the relationship:

$$y_2(n_1, n_2) = \sum_{l_1, l_2 \in G} d(n_1, n_2, l_1, l_2) \cdot x(l_1 - \delta(l_1), l_2) + \eta_2(n_1, n_2).$$

12. The method of claim 11, wherein the penalty function for the estimated low resolution images $(y_1(n_1,n_2))$ and $(y2(n_1,n_2))$ is estimated in accordance with the relationship:

$$E_d(\delta, x) = \sum_{n_1, n_2=1}^{N_1, N_2} \left( y_1(n_1, n_2) - \sum_{l_1, l_2 \in G} d(n_1, n_2, l_1, l_2) x(l_1, l_2) \right)^2 + \sum_{n_1, n_2 \in O'} \left( y_2(n_1, n_2) - \sum_{l_1, l_2 \in G} d(n_1, n_2, l_1, l_2) x(\theta(l_1), l_2) \right)^2 + \sum_{n_1, n_2 \in O} \lambda_{OCC}$$

wherein: $\theta(l_1)=l_1-\delta(l_1)$, O is the set of low resolution pixels each of which involves contribution from a high resolution site for which the high resolution pixel is occluded, and O' is the compliment of O.

13. The method of claim 7, wherein an estimated low resolution image includes a low resolution pixel having an intensity that is based on an average of one or more intensities of one or more high resolution pixels of the estimated high resolution image, wherein the plurality of estimated low resolution images includes the estimated low resolution image.

14. The method of claim 13, wherein the intensity of the estimated low resolution pixel is further based on a second disparity between the low resolution pixel and the average of the one or more high resolution pixels.

15. The method of claim 7, wherein the difference between the plurality of estimated low resolution images and the plurality of low resolution images is based on one or more comparisons between the plurality of estimated low resolution images and a plurality of down-sampled low resolution images, wherein the plurality of down-sampled low resolution images is based on the plurality of low resolution images and the estimated high resolution image.

16. An image generation system, comprising:
a memory configured to store a plurality of low resolution images of a single subject from different spatial viewpoints;
an image processing circuit configured to:
determine an estimated high resolution image from the plurality of low resolution images; and
generate a corrected high resolution image by iteratively:
determining a plurality of estimated low resolution images by down-sampling the estimated high resolution image;
determining a value of a penalty function, wherein the penalty function is based on a difference between the plurality of estimated low resolution images and the plurality of low resolution images, a Markov Random Field based on the difference between the plurality of estimated low resolution images and the plurality of low resolution images, and a Markov Random Field based on a difference between the estimated high resolution image and one of depth map or a stereo disparity map; and
determining an adjustment of one or more pixels of the estimated high resolution image based on a second difference, wherein applying the adjustment reduces the value of the penalty function; and
determine that the corrected high resolution image is a desired high resolution image when the value of the penalty function is below a threshold value.

17. The image generation system of claim 16, further comprising at least one camera to obtain the plurality of low resolution images.

18. The image generation system of claim 17, wherein the plurality of low resolution images comprise stereo images obtained from one of a plurality of stereo cameras or a translation of a stereo camera in different spatial viewpoints.

19. The image generation system of claim 16, wherein the plurality of estimated low resolution images are generated by averaging one or more pixels of the estimated high resolution image.

* * * * *

UNITED STATES PATENT AND TRADEMARK OFFICE
CERTIFICATE OF CORRECTION

PATENT NO. : 8,339,470 B2  
APPLICATION NO. : 12/627725  
DATED : December 25, 2012  
INVENTOR(S) : Narayanan et al.

Page 1 of 1

It is certified that error appears in the above-identified patent and that said Letters Patent is hereby corrected as shown below:

In the Drawings:

In Fig. 4, Sheet 4 of 4, delete "UP/UC/DSP" and insert -- $\mu P/\mu C/DSP$ --, therefor.

In Fig. 4, Sheet 4 of 4, delete Tag "618" and insert Tag -- 418 --, therefor.

In the Specifications:

In Column 1, Line 45, delete "resolution image" and insert -- resolution image, --, therefor.

In the Claims:

In Column 11, Line 20, in Claim 11, delete "y2($n_1,n_2$)" and insert -- $y_2(n_1,n_2)$ --, therefor.

In Column 11, Lines 32-33, in Claim 12, delete "(y2($n_1,n_2$))" and insert -- ($y_2(n_1,n_2)$) --, therefor.

Signed and Sealed this  
Twenty-third Day of April, 2013

Teresa Stanek Rea  
*Acting Director of the United States Patent and Trademark Office*